US009209594B2

(12) United States Patent
Takehisa

(10) Patent No.: US 9,209,594 B2
(45) Date of Patent: Dec. 8, 2015

(54) OXYGEN LASER OSCILLATOR

(71) Applicant: Kiwamu Takehisa, Kawasaki (JP)

(72) Inventor: Kiwamu Takehisa, Kawasaki (JP)

(*) Notice: Subject to any disclaimer, the term of this patent is extended or adjusted under 35 U.S.C. 154(b) by 0 days.

(21) Appl. No.: 14/368,342

(22) PCT Filed: Jan. 30, 2014

(86) PCT No.: PCT/JP2014/000478
§ 371 (c)(1),
(2) Date: Jun. 24, 2014

(87) PCT Pub. No.: WO2015/114682
PCT Pub. Date: Aug. 6, 2015

(65) Prior Publication Data
US 2015/0214694 A1    Jul. 30, 2015

(51) Int. Cl.
*H01S 3/04*  (2006.01)
*H01S 3/22*  (2006.01)
*H01S 3/041*  (2006.01)
*H01S 3/223*  (2006.01)

(52) U.S. Cl.
CPC .............. *H01S 3/2215* (2013.01); *H01S 3/041* (2013.01); *H01S 3/0407* (2013.01); *H01S 3/223* (2013.01)

(58) Field of Classification Search
CPC ..... H01S 3/0407; H01S 3/041; H01S 3/2215; H01S 3/223
USPC .................................... 372/34–36, 55, 60, 89
See application file for complete search history.

(56) References Cited

U.S. PATENT DOCUMENTS 5,900,219 A     5/1999  Schall et al.
6,650,681 B1 * 11/2003  Ullman et al. ................ 372/89

FOREIGN PATENT DOCUMENTS

CN   203295197       * 11/2013  ............. C01B 13/02
JP    63-245982 A      10/1988
JP    1-200685 A        8/1989
JP    2-181991 A        7/1990

OTHER PUBLICATIONS

Stephen C. Hurlock, "COIL technology development at Boeing," Proceedings of SPIE vol. 4631, 101-115 (2002).
Masamori Endo, et al., "History of COIL development in Japan: 1982-2002," Proceedings of SPIE vol. 4631, 116-127 (2002).
Edward A Duff, et al., "Chemical Oxygen Iodine Laser (COIL) Technology and Development," Proceedings of SPIE vol. 5414, 52-68 (2004).
Jarmila Kodymova, "COIL-Chemical Oxygen—Iodine Laser: Advances in development and applications," Proceedings of SPIE vol. 5958, 595818 (2005) (11 pages).

(Continued)

*Primary Examiner* — Yuanda Zhang
(74) *Attorney, Agent, or Firm* — Rothwell, Figg, Ernst & Manbec, P.C.

(57) ABSTRACT

The disclosed invention provides an oxygen laser oscillator which can obtain a direct lasing from a singlet oxygen molecule ($O_2(^1\Delta_g)$). The oxygen laser oscillator (100) according to the embodiment includes: a singlet oxygen generator (130) having a rotating disc (104); and a laser cavity (102) positioned immediately above the singlet oxygen generator (130) and directly connected to the singlet oxygen generator (130). In the oxygen laser oscillator according to the embodiment, a separation wall (112) may be placed between the singlet oxygen generator (130) and the laser cavity (102).

5 Claims, 9 Drawing Sheets

(56) References Cited

OTHER PUBLICATIONS

Kevin B. Hewett, "Singlet oxygen generators—the heart of chemical oxygen iodine lasers: past, present and future," Proceedings of SPIE vol. 7131, 713101 (2009) (8 pages).

Hironari Miyajima, "Investigation of a laser oscillator development based on singlet excited oxygen," The Faculty of Science and Engineering, Keio Univeristy, 1986 (67 pages).

Masamori Endo, "Chemically Pumped O2(a-X) Laser," Applied Physics B, vol. 56, 71-78 (1993).

Wolfgang O. Schall, et al., "Fluid Mechanic Aspects for Rotating Disc Generators," Proceedings of SPIE vol. 3574, 265-272 (1998).

Karin M. Grunewald, et al., "Effects of the Gas Mixing on COIL Performance," Proceedings of SPIE vol. 3574, 315-320 (1998).

Masamori Endo, "Development of high pressure singlet oxygen generator and its application to chemical lasers" (203 pages).

* cited by examiner

OXYGEN LASER OSCILLATOR

CROSS REFERENCE TO RELATED APPLICATION

This application is a 35U.S.C. 371 National Phase Entry Application from PCT/JP2014/000478, filed Jan. 30, 2014, the disclosure of which is incorporated herein in its entirety by reference.

TECHNICAL FIELD

The present invention relates to an oxygen laser oscillator whose purpose is to obtain a direct laser oscillation from an excited oxygen molecule.

BACKGROUND ART

It is known that a singlet oxygen molecule ($O_2(^1\Delta_g)$) is generated from the chemical reaction of chlorine gas with a mixed solution of hydrogen peroxide solution ($H_2O_2$) and potassium hydroxide (KOH) or sodium hydroxide (NaOH). A chemical oxygen iodine laser (generally called COIL, COIL being an abbreviation for Chemical Oxygen Iodine Laser) which operates as a laser by transferring energy of $O_2(^1\Delta_g)$ to an iodine atom (I) (i.e. generating $I(^2P_{3/2})$ in an exited state from $I(^2P_{1/2})$ in a ground state) is commonly known as a high energy laser of 1.315 um. Non-Patent literature 1 to 4 explains about the chemical oxygen iodine laser.

Historically, so-called spargers are often used for the above chemical reaction to generate a singlet oxygen generator which is explained in non-Patent literature 5. In the spargers, bubble chlorine gas goes through the mixed solution of $H_2O_2$ and (KOH or NaOH) which is called basic hydrogen peroxide (BHP). More particularly, the spargers were mostly used for the COIL from 1977, which is just after the COIL was invented, until the mid-1990s.

While in the 1980s a so called wetted-wall method was used in which chlorine gas contacts a wall which is wetted with BHP solution. Especially, rotating disk generators, which are used in one of the wetted-wall methods, were widely used until the end of 1990s since it is easy to increase a supply amount of the BHP solution by using this method.

After this, so-called jet generators have been used, which have contributed to a high power COIL operation. In the jet generators, BHP solution is injected through nozzles, and is reacted with chlorine gas. Since the total BHP solution surface is large, a large amount of chemical reaction is induced in a short time.

However, the jet generators generate droplets of BHP solution from the injected BHP solution. Since the droplets are transported into a laser cavity, it was pointed out that the droplets negatively affect the laser oscillation. Therefore, so-called aerosol generator has been developed. Since relatively large droplet-generation is suppressed, it is considered to be one of the most advanced methods for generating the singlet oxygen molecule.

One of the reasons for utilizing the energy transfer from the excited $O_2(^1\Delta_g)$ to iodine as the chemical oxygen Iodine laser is that it is considered that direct lasing from $O_2(^1\Delta_g)$ is difficult. Actually, there has been no report concerning direct lasing from $O_2(^1\Delta_g)$. However, there is a report which says weak light was detected in an experiment which aims at achieving the direct lasing of $O_2(^1\Delta_g)$. In the experiment, a spectrum observation to prove the lasing was not performed. Non-Patent literature 6 is the only a report which says that the direct lasing from $O_2(^1\Delta_g)$ was successful. According to the Non-Patent literature 5, although the lasing of the oxide laser was confirmed, only a small amount of energy was generated. Since there has been no other report concerning the direct lasing of $O_2(^1\Delta_g)$ after this experiment, it has been considered that the realization of an oxygen laser is quite difficult.

The reason why the direct $O_2(^1\Delta_g)$ lasing is difficult is that the quite long spontaneous emission lifetime of $O_2(^1\Delta_g)$ makes a laser gain, which is inversely proportional to the spontaneous emission lifetime, quite small. However, the small gain does not mean that the lasing is impossible. It just means that lasing is difficult. Therefore it is considered that if the gain length is quite long, lasing is possible. The lasing possibility is shown in the non-Patent literature 7, in which theoretical considerations including experiments are explained along with the purpose of $O_2(^1\Delta_g)$ lasing.

It is considered that if a large amount of $O_2(^1\Delta_g)$ is generated in a short time, high pressure $O_2(^1\Delta_g)$ can fill the inside of the laser cavity in a moment. This gives high gain, and can make the lasing easier. Therefore, it is considered that a pulsed laser operation makes lasing easier. The non-Patent literature 6 and 7 refer to the experiments which aim at conducting a pulsed laser operation.

CITATION LIST

Non Patent Literature

Non Patent Literature 1: Stephen C. Hurlick, et al., "COIL technology development at Boeing", Proceedings of SPIE Vol. 4631, pp. 101-115, 2002

Non Patent Literature 2: Masamori Endo, "History of COIL development in Japan: 1982-2002", Proceedings of SPIE Vol. 4631, pp. 116-127, 2002

Non Patent Literature 3: Edward A. Duff and Keith A. Truesdell, "Chemical oxygen iodine laser (COIL) technology and development", Proceedings of SPIE Vol. 5414, pp. 52-68, 2004

Non Patent Literature 4: Jarmila Kodymova, "COIL-Chemical Oxygen Iodine Laser: advances in development and applications", Proceedings of SPIE Vol. 5958, p. 595818, 2005

Non Patent Literature 5: Kevin B. Hewett, "Singlet oxygen generators—the heart of chemical oxygen iodine lasers: past, present and future", Proceedings of SPIE Vol. 7131 (2009).

Non Patent Literature 6: Hironari Miyajima, "Investigation of a laser oscillator development based on singlet excited oxygen", The Faculty of Science and Engineering, Keio University, 1986

Non Patent Literature 7: Masamori Endo, et al., "Chemically Pumped O2(a-X) Laser", Applied Physics B, Vol. 56, 71-78 (1993).

Non Patent Literature 8: Wolfgang O. Schall, et al., "Fluid Mechanic Aspects for Rotating Disc Generators", Proceedings of SPIE Vol. 3574, 265-272 (1998).

Non Patent Literature 9: Karin M. Grunewald, et al., "Effects of the Gas Mixing on COIL Performance", Proceedings of SPIE Vol. 3574, 315-320 (1998).

SUMMARY OF INVENTION

Technical Problem

Concerning the non-Patent literature 7, however, very small droplets of the BHP solution, which are called mist, are generated in the $O_2(^1\Delta_g)$ generation. It is pointed out that the mist hinders the lasing due to scattering of the radiation. A porous pipe generator was used as an aerosol generator, and thus it could not suppress the generation of the mist. Although it may be considered that a filter which separates $O_2(^1\Delta_g)$ from the mist can be used, it is anticipated that $O_2(^1\Delta_g)$ will be deactivated and/or the oxygen transmission decreased. Therefore, it becomes difficult to fill enough high pressure $O_2(^1\Delta_g)$ in the laser cavity.

The present invention can solve the above mentioned problems which hinder the lasing of the oxygen laser oscillator, and can provide the oxygen laser oscillator with a configuration which can easily generate a pulsed laser.

Solution to Problems

In order to solve the above mentioned problems, an oxygen laser oscillator according to the present invention employs a rotating disc generator for a singlet oxygen generator, and places a laser cavity immediately above the oxygen generator. The rotating disc generator is explained in the non-Patent literature 5, 8 and 9.

The rotating disc generator utilizes the chemical reaction based on a surface reaction in order to generate $O_2(^1\Delta_g)$, while the bubble generator and the jet generator utilize the flow off the BHP droplets. The aerosol generator, shown in the non-Patent literature 7, generates BHP mist. Compared with the bubble generator, the jet generator and the aerosol generator, the rotating disc generator generates $O_2(^1\Delta_g)$ by a calm surface reaction. Therefore, a method in which the rotating disc generator is used hardly generates the droplets.

However, simply utilizing the rotating disc generator for the singlet oxygen generator (SOG) in the conventional COIL, cause the following problem. The conventional rotating disc generator has a structure which is illustrated in FIG. 10. In a SOG 901, BHP solution 906 is filled. A rotating disc 904 which rotates around a rotation axis 905 is attached in the SOG 901. Chlorine gas, indicated by an arrow 907, is supplied to the BHP solution 906. Therefore $O_2(^1\Delta_g)$ is generated in the SOG 901 by the reaction between the BHP solution and the chlorine gas. $O_2(^1\Delta_g)$ flows through a reaction portion 902 as indicated by an arrow 908.

Iodine atom injectors 909 are placed in the reaction portion 902. Therefore, mixture of iodine atoms and $O_2(^1\Delta_g)$ flows through the reaction portion 902 as indicated by an arrow 910. Then excited iodine atoms are generated in the reaction portion 902 by the reaction between the iodine atoms and $O_2(^1\Delta_g)$. The excited iodine atoms go through the reaction portion 902, and come into a laser cavity 903. Therefore, the laser cavity 903 is filled with the excited iodine atoms. The reaction portion 902 is pumped out through the laser cavity 903 as indicated by an arrow 912.

The reaction portion 902 may be long enough in order to mix the fast flowing $O_2(^1\Delta_g)$ with the iodine atoms well. Consequently, an inside volume of the laser cavity 903 comprises as little as 10-30% of the total volume which is filled with $O_2(^1\Delta_g)$. By the way, an optical axis OA9 of a laser light is perpendicular to a paper.

In the present invention, the SOG and the laser cavity may be closely connected. This enables the rate of the laser cavity volume divided by the total volume to be increased to as high as more than 80%. Therefore, the laser cavity is filled with $O_2(^1\Delta_g)$ at 3-9 times higher pressure than that of conventional COIL if the same mass of $O_2(^1\Delta_g)$ is generated. Consequently, a high gain can be obtained, and the lasing is made easier.

While it is necessary to generate high pressure $O_2(^1\Delta_g)$ in a short time in order to obtain a high gain, a high gain can also be obtained by generating a large amount of chemical reaction by injecting a large amount of chlorine gas in a short time. Therefore, the fast-flowing chlorine gas may generate relatively large droplets from the surface of the BHP solution in spite of employing the surface reaction. The droplets may affect the lasing when the droplets come into the laser cavity. Therefore, in the present invention, a separation wall is placed between the SOG and the laser cavity.

The rotation axis of the rotating disc generator may be made of pipe in order to suppress the droplet generation. A coolant can flow through the pipe. This enables the rotating disc to be cooled down. Accordingly the BHP solution, which covers the surface of the rotating disc, is cooled to almost the same temperature as that of the rotating disc. Since colder BHP solution is, higher viscosity is, a surface tension of the BHP solution is increased. Therefore, the droplets are hardly formed when the fast-flow chlorine gas flows on the surface of the solution. The rotating disc and the rotation axis may be made of corrosion resistant metal.

The lower the temperature of the BHP solution, the less easily the droplets generate. In the present invention, the coolant can flow through the rotating axis to cool the BHP solution, instead of externally supplying pre-cooled BHP solution into the SOG. Since the chemical reaction to produce $O_2(^1\Delta_g)$ heats the BHP solution by its reaction heat, just supplying the pre-cooled BHP solution from outside increases its temperature immediately. On the other hand, the present invention can keep the BHP solution at a low temperature even though $O_2(^1\Delta_g)$ continues to be generated since the rotating disc can be continuously cooled.

Another advantage of the above-mentioned cooling by flowing the coolant inside the rotation axis is that the BHP solution which contacts the rotating disc can be cooled enough even if a rotation speed is low. Therefore the rotation speed can be reduced. When the rotation speed is low, the droplets generation can be suppressed since the centrifugal force becomes small. While in the case of cooling the BHP solution from an outside of the solution container, the rotation speed may be high enough for the temperature of the solution on the disc to be kept low. This easily causes droplet generation.

Advantageous Effects of Invention

The present invention provides an oxygen laser oscillator which easily generates a pulsed laser.

DESCRIPTION OF EMBODIMENTS

Figure 1:
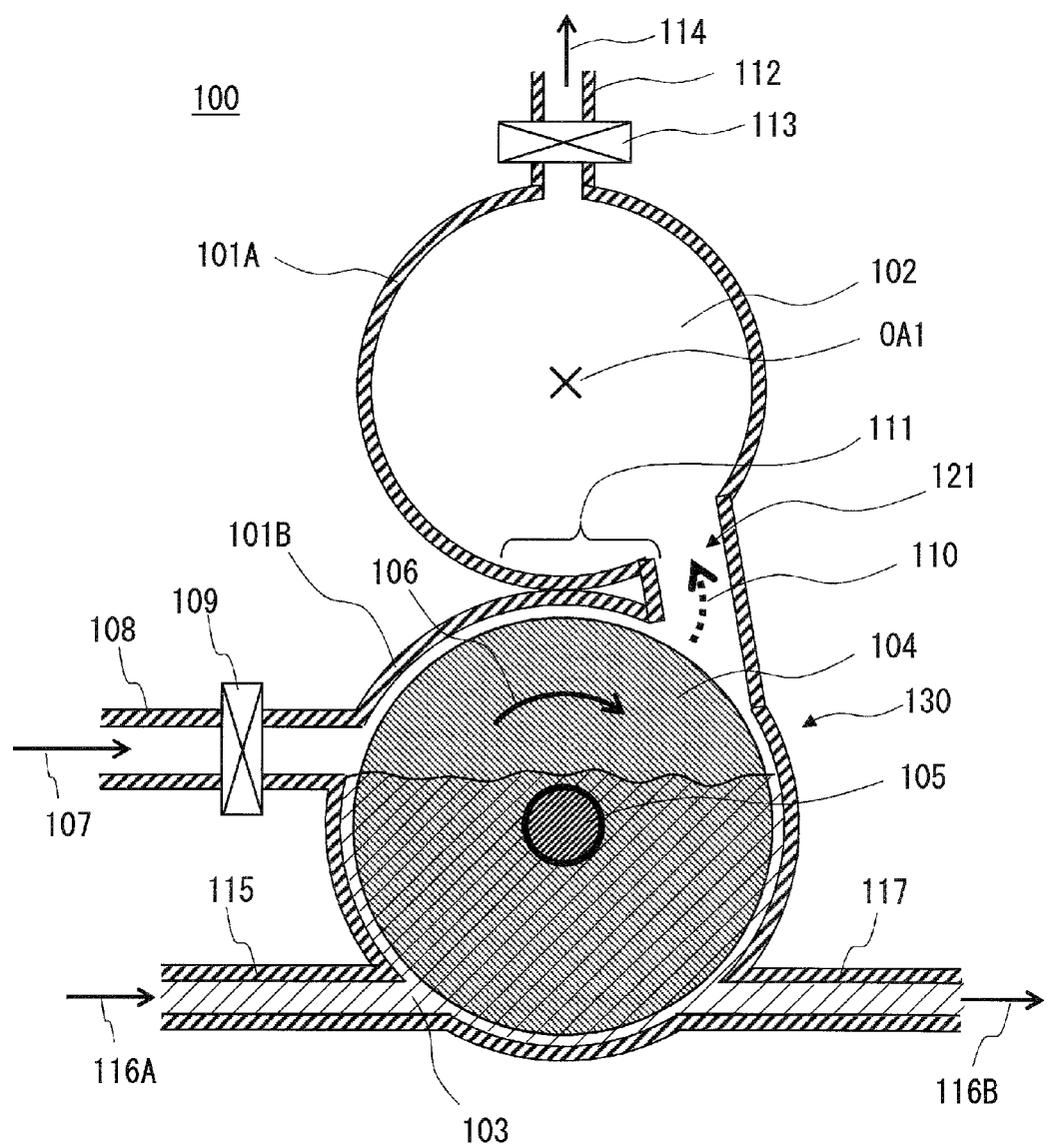
FIG. 1 is a cross sectional drawing of an oxygen laser oscillator 100 according to an embodiment of the present invention.

Exemplary embodiments of the present invention are explained with reference to the attached drawings. The exemplary embodiments explained below are examples of the present invention, and the present invention is not limited to these exemplary embodiments. Note that components denoted by the same reference numerals in the specification and drawings indicate the same components.

First Embodiment

Hereinafter, the first embodiment according to the present invention is described based on FIG. 1. FIG. 1 shows a cross-sectional configuration showing an oxygen laser oscillator 100 according to the present invention, which is perpendicular to an optical axis OA1 of a laser. The oxygen laser oscillator 100 has a laser cavity 102 and a singlet oxygen generator (SOG) 130. The oxygen laser oscillator 100 has a structure integrating a housing 101A of the laser cavity 102, in which a laser beam passes, with a housing 101B of the SOG 130. Each of the housings 101A and 101B is a thick-walled pipe. The thick-walled pipe is made of metal having corrosion resistance against a BHP solution and chlorine gas.

The housing 101B is filled with the BHP solution 103. A rotating disc 104 is rotatably placed in the housing 101B. In the housing 101B, the rotating disc 104 can rotate around the rotation axis 105. The direction of the rotation axis 105 is parallel to a thickness direction of the rotating disc 104. The rotation axis 105 is perpendicular to a paper of FIG. 1. The rotation axis 105 is positioned at the center of the rotating disc 104.

More than half of the rotating disc 104 is submerged in the BHP solution. The desirable material for the housings 101A and 101B is a Nickel-base alloy such as Monel, Inconel or Hastelloy because the Nickel base alloys have high corrosion resistance. Furthermore, a transparent polyvinyl chloride pipe can be used for the housings 101A and 101B in order to observe their inside.

For instance, the housing 101B is a cylindrical shape whose longitudinal direction is located along a direction perpendicular to the paper. The inside space of the housing 101B is larger than an outer diameter of the rotating disc 104. The housing 101B has an injection pipe 108, a supply pipe 115 and a drain pipe 117. The injection pipe 108 is connected to an upper position of the housing 101B. The supply pipe 115 and the drain pipe 117 are connected to a lower position of the housing 101B. The supply pipe 115 and the drain pipe 117 are located below the injection pipe 108. For instance, the injection pipe 108 is connected to the housing 101B at a position higher than that of the rotation axis 105. The supply pipe 115 and the drain pipe 117 are connected to the housing 101B at a position lower than that of the rotation axis 105. The plurality of the injection pipes 108, the plurality of the supply pipes 115 and the plurality of the drain pipes 117 may be lined along the direction perpendicular to the paper, respectively.

A path 121 is connected to the housing 101B. The path 121 is connected to the housing 101B at a position higher than that of the injection pipe 108. The path 121 connects the inside space of the housing 101B to that of the housing 101A. That is, one end of the path 121 is connected to the housing 101B and the other end is connected to the housing 101A. The laser cavity is positioned immediately above the SOG, and is directly connected with the SOG 130. That is, the laser cavity is directly connected to the SOG 130 through the path 121.

The rotating disc 104 rotates around the rotation axis 105 in a direction shown by an arrow 106. Consequently, a surface of an upper portion, which is not submerged in the BHP solution 130, of the rotating disc 104 is covered with the BHP solution 103. The rotating disc 104 is also made of corrosion resistance metal. The rotation axis 105 is a metal pipe. A coolant which is cooled to −20 degrees C. flows into the inside of the rotation axis 105. Since the rotation axis 105 and the rotating disc 104 are made of metal, the rotation axis 105 and the rotating disc 104 have high thermal conductivity. Therefore, the rotating disc 104 is kept at around −20 degrees C. The materials of the rotating disc 104 and the rotation axis 105 are preferably the Nickel-base alloy having the high corrosion resistance.

In order to generate $O_2(^1\Delta_g)$, the chlorine gas is supplied in a direction shown by an arrow 107. Then the chlorine gas is injected into the housing 101B through the injection pipe 108. The injection pipe 108 has a valve 109 which can be opened or closed. That is, the valve 109 is located just before the housing 101B, and the valve 109 opens only at the time of $O_2(^1\Delta_g)$ generation. When the chlorine gas is supplied to the housing 101B, the chlorine gas reacts with the BHP solution at the surface of the rotating disc 104. This reaction generates $O_2(^1\Delta_g)$.

$O_2(^1\Delta_g)$ which is generated in the housing 101B flows through the path 121 as shown by a dotted arrow 110. Then $O_2(^1\Delta_g)$ flows into the laser cavity 102. Although only one injection pipe is illustrated in FIG. 1, in fact a plurality of the injection pipes 108 is lined in the direction perpendicular to the paper.

The rotation axis 105 is a hollow pipe. The coolant flows through a hollow portion of the rotation axis 105. This keeps the rotation axis 105 and the rotating disc 104 at a low temperature. When the rotating disc 104 is kept at −20 degrees C., the BHP solution can be kept at almost the same temperature as that of the rotating disc 104. Consequently, the viscosity of the BHP solution becomes 30 mPa·s, which is three times higher than that at 0 degree C. This makes it difficult to blow off the BHP solution which covers the surface of the rotation disc 104, even if the chlorine gas flows fast to the surface of the rotation disc 104. Moreover, the high viscosity can suppress the BHP solution blown off by a centrifugal force of the rotating disc 104. The non-Patent literature 8 explains about the viscosity of the BHP solution. The viscosity of the BHP solution at 0 degree C. is 10 mPa·s, while it is 30 mPa·s at −20 degrees C., which is three times higher than that at 0 degree C.

Even if the fast flowing chlorine gas may blow off the BHP solution on the surface of the rotating disc 104, the viscosity of the BHP solution becomes high. Accordingly, generated droplets are not small like mist, but instead have a relatively large size. Therefore the droplets are not brought into the laser cavity 102 together with $O_2(^1\Delta_g)$ flowing as shown by the dotted line 110.

Also in this configuration, a separation wall 111 is located below the laser cavity 102 to separate the housing 101A from the housing 101B. Therefore, the separation wall 111 can stop the droplets flying in a straight line from the surface of the rotating disc 104. This prevents the droplets from passing across the laser cavity 102. Although the separation wall 111 is a part of the hollow housings 101A and 101B, instead some plates can be used if they can be placed between the rotating disc 104 and the laser cavity 102. However, the path 121 is formed on the right side of the separation wall. It is necessary to form a space in a part of the housing 101B to bring $O_2(^1\Delta_g)$ into the laser cavity 102. Therefore, the part of the housing 101b connects to the path 121. As can be seen in FIG. 1, the separation wall 111 is positioned such that a line extending from the rotation axis 105 to the optical axis OA1 passes through the separation wall 111.

Figure 2:
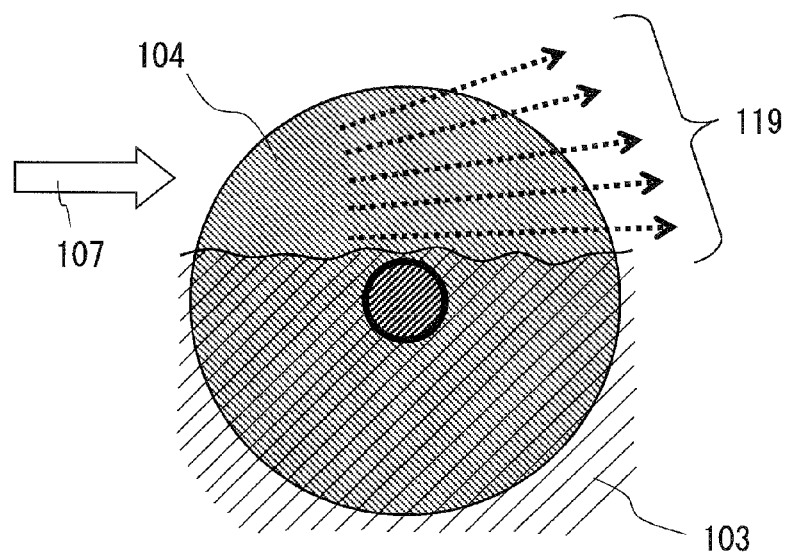
FIG. 2 is an explanation drawing explaining droplets generated from the rotating disc 104 of the oxygen laser oscillator 100.
Figure 3:
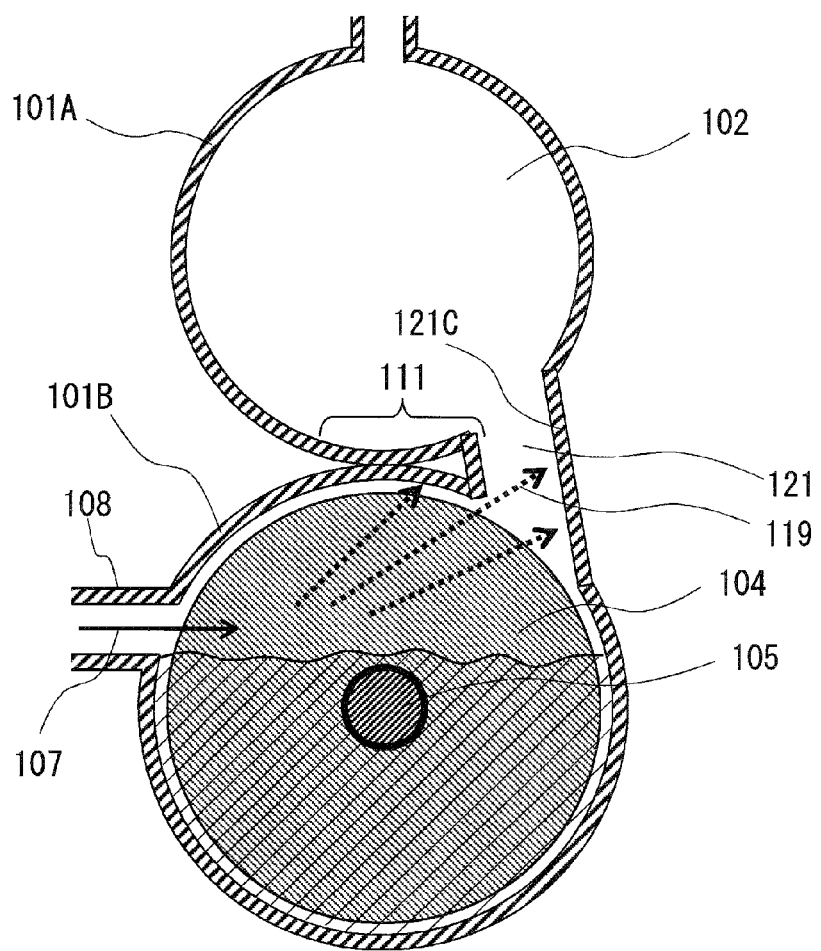
FIG. 3 is an explanation drawing of the droplets generated from the rotating disc 104 of the oxygen laser oscillator 100.

The function of the separation wall 111 will be explained using the FIGS. 2, 3, and 4. As shown in the FIG. 2, the chlorine gas, shown by an arrow 107, is injected into the housing 101B at a high speed. Then relatively large droplets 119 may be blown off from the surface of the rotating disc 104, and fly straight. Therefore the droplets 119 are blocked by the separation wall 111 shown in the FIG. 3 or go into the path 121. However, the droplets 119 which go into the path 121 just hit the inside wall 121C which is at the right side of the path 121. Therefore the droplets 119 do not directly come into the laser cavity 102.

Figure 4:
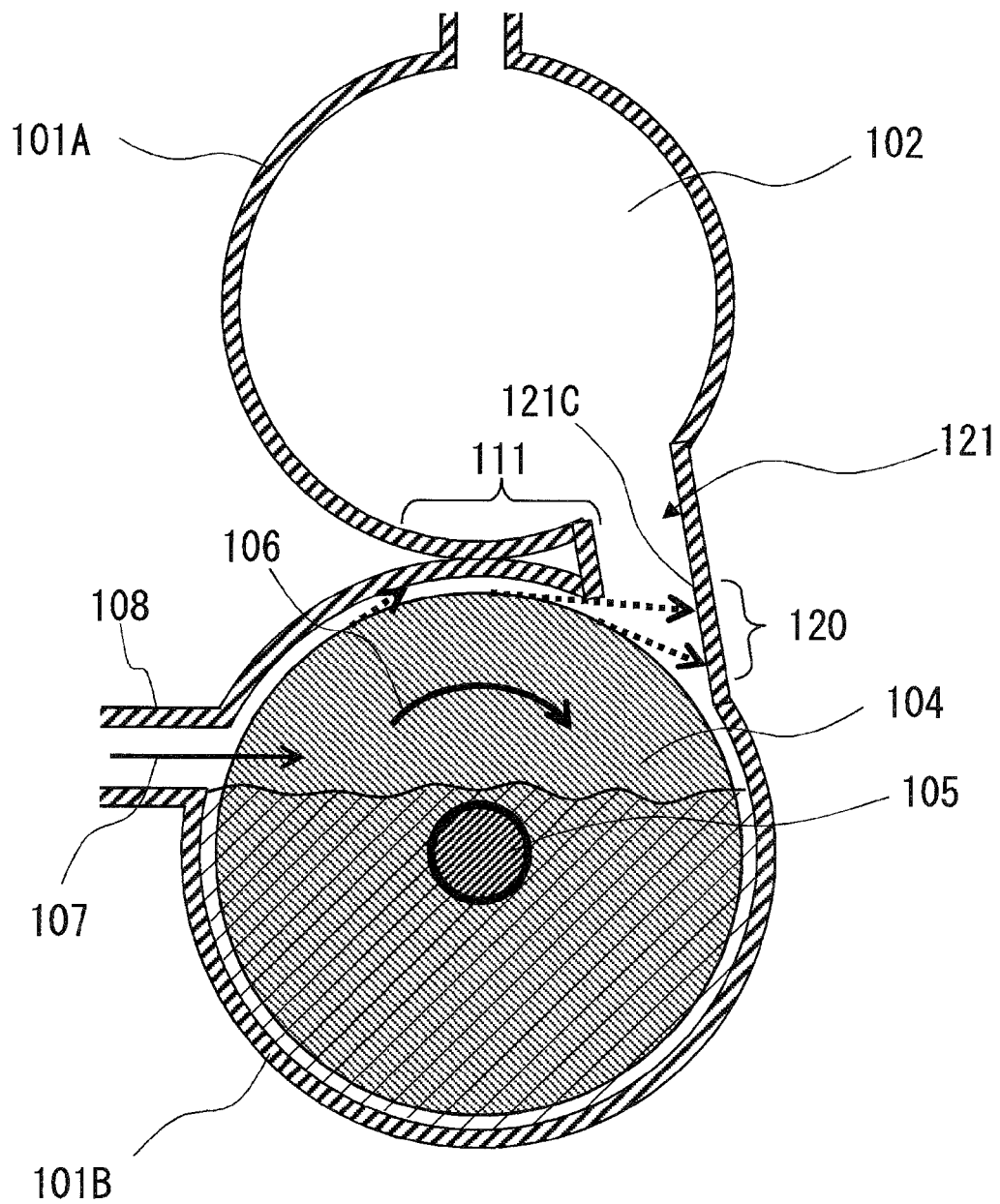
FIG. 4 is an explanation drawing of the droplets 119B generated from the rotating disc 104 by a centrifugal force.

When droplets 120 are formed by the centrifugal force of the rotating disc 104 as shown in the FIG. 4, the droplets 120 fly into directions of tangential lines of a circumference of the rotating disc 104. Consequently, the droplets 120 are blocked by the separation wall 111. Therefore, the droplets 120 do not directly come into the laser cavity 102.

By the way, since the rotating disc 104 rotates clockwise as shown by the arrow 106, the path 121 is formed on a right side of the separation wall 111. As described above, the rotational disk 104 rotates in a direction which is substantially same as the direction from the separation wall 111 toward the path 121. Therefore, the droplets 120 blown off from the rotating disc 104 by the centrifugal force do not directly come into the laser cavity 102. In other words, as viewed in a cross section perpendicular to the rotation axis 105, in the upper portion of the housing 101B, the position of the separation wall 111 may be at the upstream side of the rotation, while the position of the path 121 may be at the downstream side of the rotation.

For example, when looking at the SOG 130 along the rotation axis 105 so that the rotating disc 104 rotates clockwise, it is seen that the path 121 is positioned at the right side of the separation wall 111. On the other hand, when looking at the SOG 130 along the rotation axis 105 so that the rotating disc 104 rotates counter-clockwise, the path 121 is positioned at a left side of the separation wall 111. Thus, in a planar view perpendicular to the rotation axis 105, a positional relation between the path 121 and the separation wall 111 is decided by the rotation direction of the rotating disc 104. In FIG. 1, the separation wall 111 is positioned just above the rotation axis 105. The path 121 is positioned at the right side from the rotation axis 105.

By the way, just before a laser operation, the laser cavity 102 is pumped out beforehand through an exhaust pipe 112 as shown in FIG. 1. In order to do this, a valve 113, which is located just above the laser cavity 102, is opened beforehand, and then the laser cavity 102 is pumped out in a direction shown by an arrow 114. After the pumping, the valve 113 is closed so that the generated $O_2(^1\Delta_g)$ can fill inside the laser cavity 102. To sum up, the inside space of the housing 101A is filled with $O_2(^1\Delta_g)$ after the valve 113 is closed. Since the valve 113 is located close to the housing 101A, a dead space positioned before the valve 113 and outside the housing 101A is small. That is, in the exhaust pipe 112, the valve 113 is positioned just near the housing 101A. A vacuum pump which is not shown is connected to the exhaust pipe 112.

As explained above, in the oxygen laser oscillator 100, the housing 101B which forms SOG 130 is directly connected to the housing 101A which forms the laser cavity 102. Therefore, after closing the valve 113, the generated $O_2(^1\Delta_g)$ fills the laser cavity 102 whose space is nearly all space where $O_2(^1\Delta_g)$ can fill. Since the percentage of the volume of the laser cavity 102 out of the all the volume filled by $O_2(^1\Delta_g)$ is around 90%, the dead space becomes quite small. Therefore, it is easy to fill the laser cavity 102 with $O_2(^1\Delta_g)$ at a high pressure. Consequently, a high gain can be obtained, and a pulsed lasing can easily be attained.

By the way, the BHP solution 103 is supplied through the supply pipe 115 as shown by an arrow 116A and is accumulated in a lower portion of the housing 101B. Cooled BHP solution can be supplied through the supply pipe 115. Since $H_2O$ is generated in the BHP solution 103 by the chemical reaction for the $O_2(^1\Delta_g)$ generation, the concentration of the BHP solution 103 is decreased. Therefore, the $H_2O$ and the BHP solution 103 are drained through the drain pipe 117 as shown by an arrow 116B. In regard to the drained BHP solution, a generated salt is removed, the concentration is controlled, and then the BHP solution is supplied to the housing 101B through the supply pipe 115 again.

Figure 5:
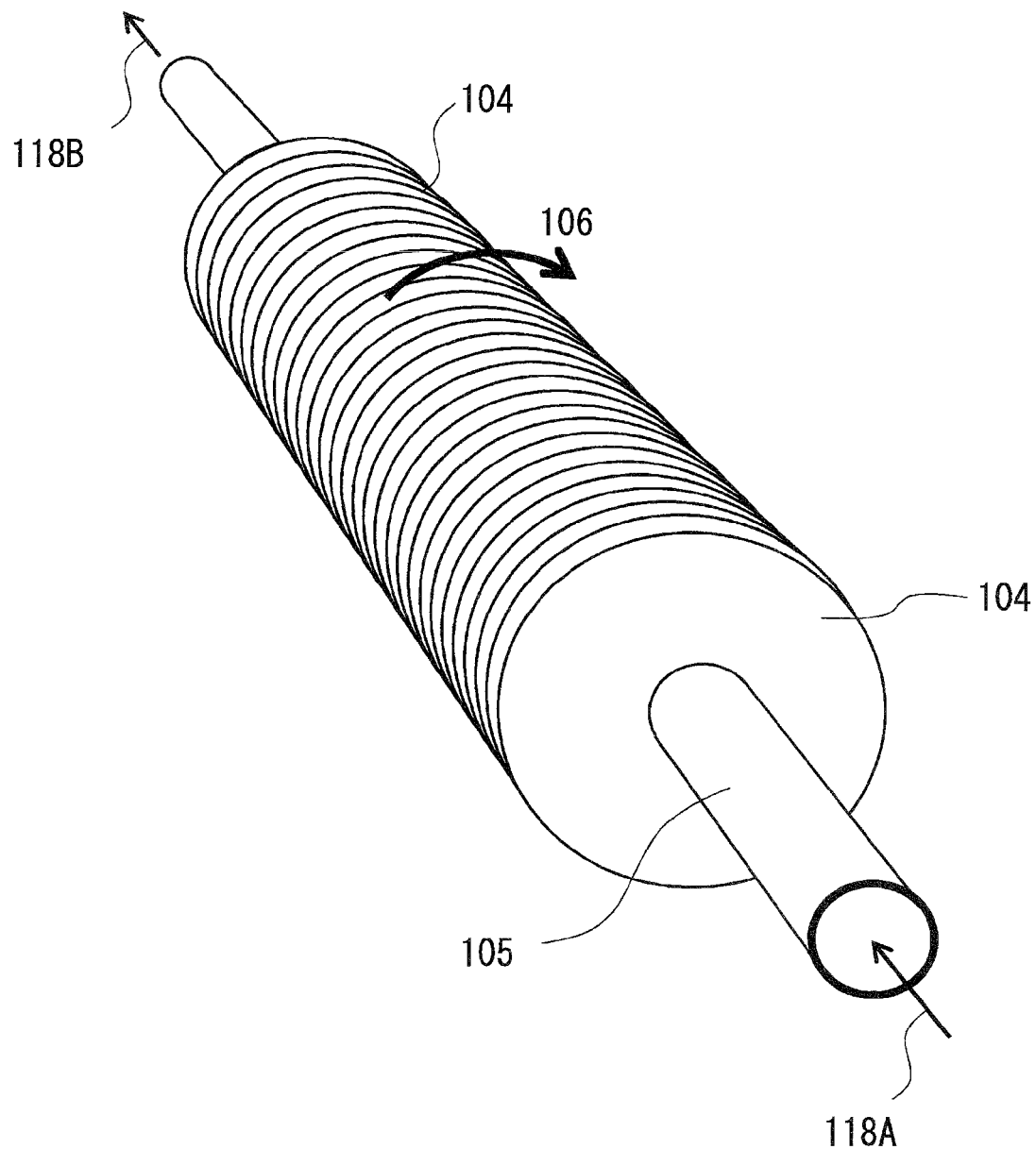
FIG. 5 is a perspective view of the rotating disc 104 and a rotation axis 105 of the oxygen laser oscillator 100.

FIG. 5 shows a perspective view of the rotating disc 104 and the rotation axis 105. A number of the rotating discs 104 are closely placed. In other words, a plurality of the rotating discs 104 are aligned coaxially. All of the rotating discs 104 have the same size. All of the rotating discs 104 are pierced through the rotation axis 105 to be fixed. That is, the rotation axis 105 penetrates through the plurality of the rotating discs 104. Therefore, the plurality of the rotating discs 104 rotate around the rotation axis 105.

The coolant flows into the rotation axis 105 as shown by an arrow 118A, and flows out as shown by an arrow 118B. Therefore, the rotation axis 105 and the rotating discs 104 which contact the rotation axis 105 can be kept at a low temperature. Employing the many rotating discs 104 can increase a total surface area for the chemical reaction of the $O_2(^1\Delta_g)$ generation.

Figure 6:
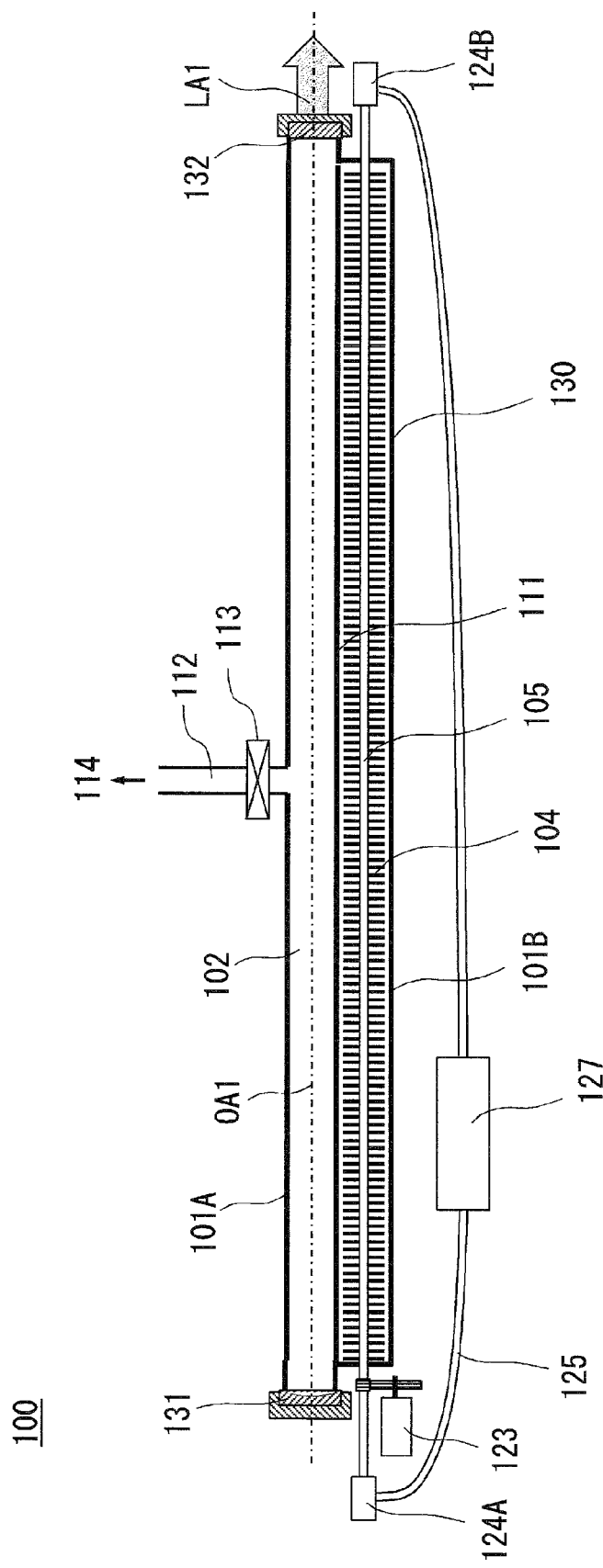
FIG. 6 is a cross-sectional side-view drawing of the oxygen laser oscillator 100.

FIG. 6 shows a side view of the cross sectional drawing of the oxygen laser oscillator 100. The laser cavity 102 is composed of a total reflector 131 and an output mirror 132 which are attached at the both ends of the housing 101A. The total reflector 131 is attached to one end of the cylindrical housing 101A and the output mirror 132 is attached to the other end. A laser radiation reflects at the total reflector 131 and goes into the output mirror 132. One portion of the laser radiation is extracted from the output mirror 132, and the remainder thereof is reflected toward the total reflector 131. Therefore, the laser is extracted as LA1. The cylindrical housing 101B and the cylindrical housing 101A are placed parallel to each other. The optical axis of the laser is substantially parallel to the rotation axis 105.

Figure 7:
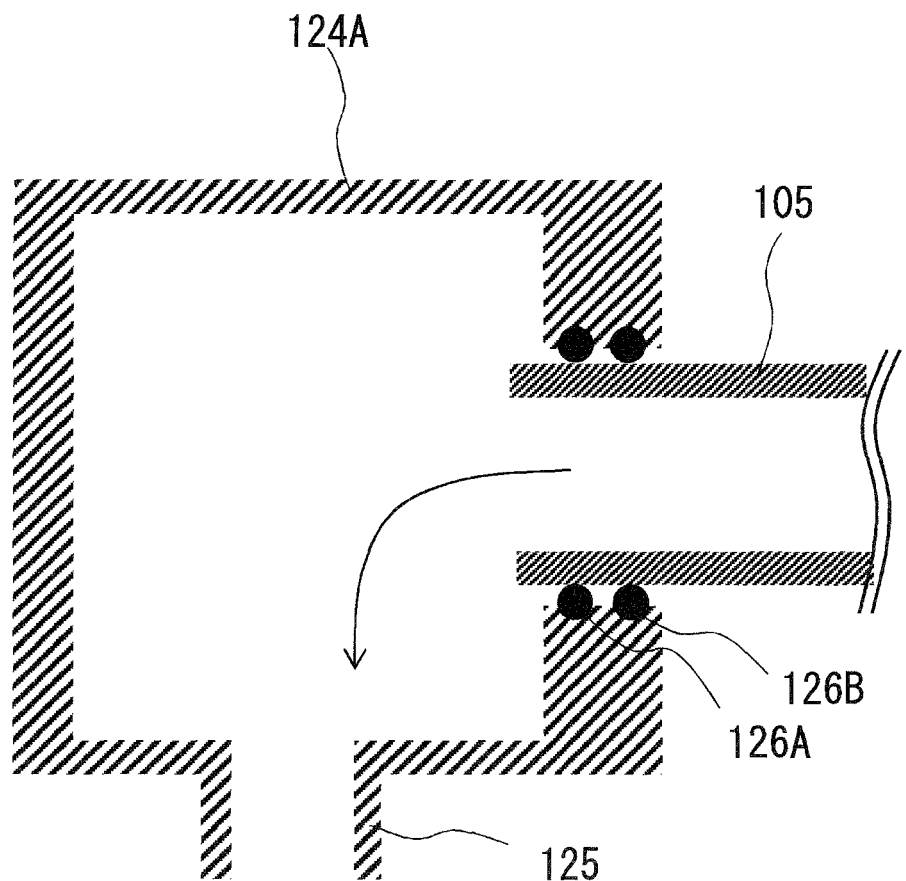
FIG. 7 is a cross sectional drawing of a structure to flow a coolant into and out of the rotation axis 105 of the oxygen laser oscillator 100.

The pipe-shaped rotation axis 105 is rotatably attached to a motor 123. The rotation axis 105 is held by a flow controller 124A and a flow controller 124B which control the flow of the coolant. The details of this are shown in FIG. 7 which is a cross section drawing of the flow controller 124A. The rotation axis 105 is held and sealed with two O rings 126A and 126B. Since the flow controller 124A holds the rotation axis 105, the coolant flows as shown by an arrow. Therefore, the coolant can flow and circulate without leaking from the inside of the rotation axis 105. Although it is not shown in FIG. 6, O rings are similarly attached to both walls of the housing 101B through which the rotation axis 105 penetrates.

A tube 125 which connects the flow controller 124A to the flow controller 124B has a cooling device 127 which can keep the coolant flowing through the tube 125 at a constant temperature. Concerning the coolant, it is desirable to use one which cannot be frozen at −20 degrees C., and does not corrode metal. One such coolant is Galden which is one of the fluorinated fluids. Alcohols can also be used.

Second Embodiment

Figure 8:
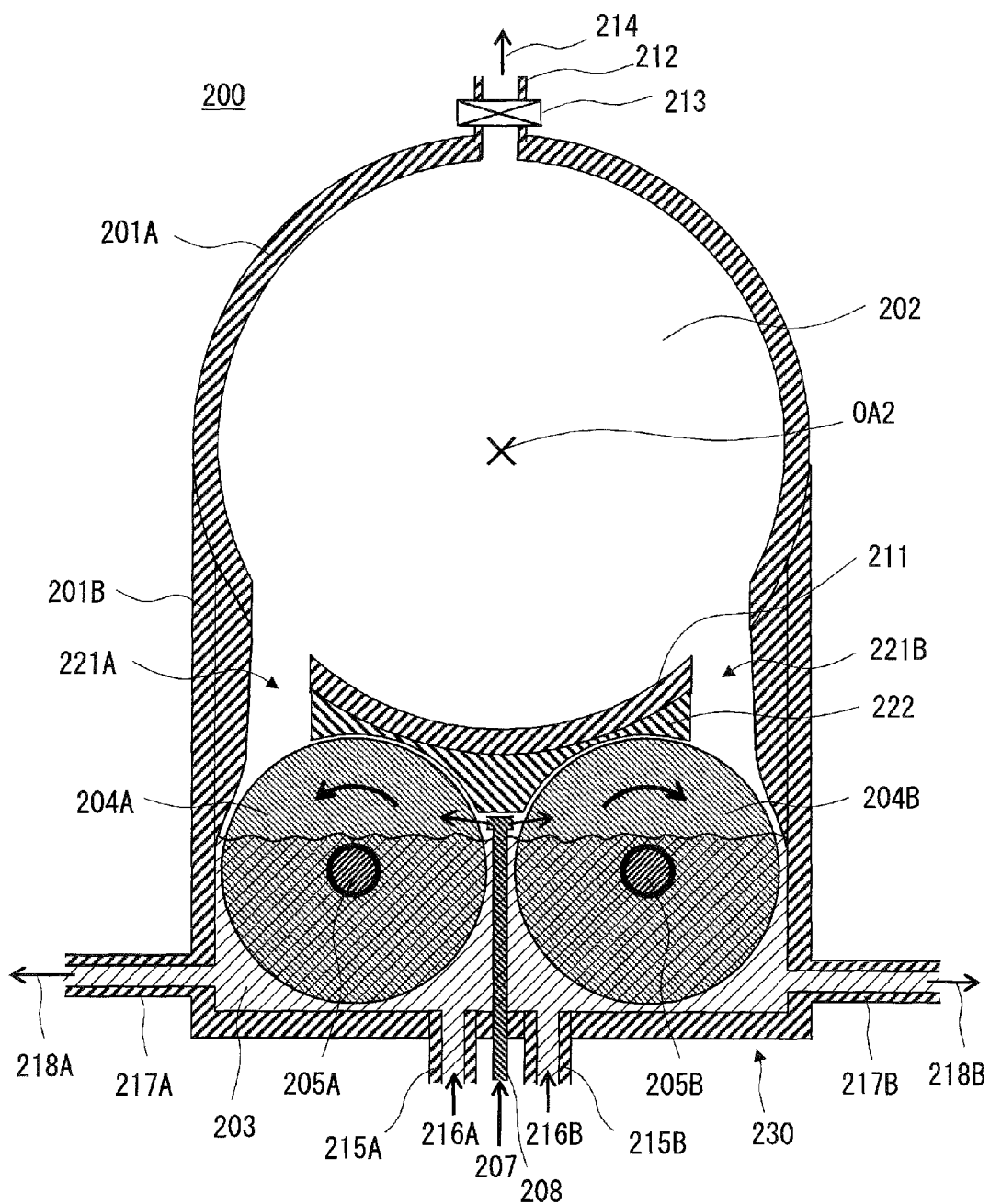
FIG. 8 is a cross sectional drawing of an oxygen laser oscillator 200 according to an embodiment of the invention.

Next, a second embodiment according to the present invention will be described with reference to FIG. 8. FIG. 8 shows a cross sectional drawing of an oxygen laser oscillator 200. The oxygen laser oscillator 200 has a laser cavity 202 which is formed by a housing 201A made of a large-diameter thick-walled pipe to obtain a large mode volume. Therefore, the oxygen laser oscillator 200 is designed to generate much higher laser energy than that of the oxygen laser oscillator 100 shown in the FIG. 1.

In order to generate the high laser energy, a SOG 230 has double-row rotating discs 204A and 204B. This configuration is different from that of the first embodiment. An explanation of contents similar to those of the first embodiment will be omitted.

The rotating discs 204A and 204B are aligned side by side. A rotation axis 205A which is for the rotating disc 204A and a rotation axis 205B which is for the rotating disc 205B are parallel to each other. The rotating direction of the rotating disc 204A and that of the rotating disc 205B are opposite as shown by arrows in FIG. 8. In FIG. 8, the rotating disc 204A rotates counter-clockwise and the rotating disc 204B rotates clockwise. In order to prevent the rotating disc 204A and the rotating disc 204B from interfering with each other, the rotation axis 205A is placed apart from the rotation axis 205B.

Although only two discs are illustrated in the FIG. 8, the rotating disc 204A and the rotating disc 205B consist of many discs which are aligned in the direction perpendicular to the paper. Since this is similar to the configuration shown in the FIG. 5 and so on, the detailed explanation is omitted. The rotation axis 205A and the rotation axis 205B are hollow in order to flow coolant inside of them. Since this is also similar as the configuration shown in the FIGS. 6, 7, and so on, the detailed explanation will be omitted.

The chlorine gas to start the chemical reaction is supplied from the injection pipe 208 which is installed at a lower portion of the housing 201B. The chlorine gas flows through the injection pipe 208 from underneath, and is emitted to right and left from an upper end of the injection pipe 208 as shown by arrows. The injection pipe 208 is attached between the rotating disc 204A and the rotating disc 205B. The injection pipe 208 goes through a bottom of the housing 201B and is extended to above a solution level of the BHP solution 203.

Supply pipe 215A and supply pipe 215B are connected at the lower portion of the housing 201B. The supply pipes 215A and 215B are installed at the bottom of the housing 201B. The BHP solution flows into housing 201B through the supply pipes 215A and 215B as shown by arrows 216A and 216B. The drain pipe 217A and the drain pipe 217B are connected at side surfaces of the housing 201B. The drain pipe 217A and the drain pipe 217B are connected at the side opposite surfaces of the housing 201B. In this structure, the drain pipe 217A is connected at the left side of the housing 201B, while the drain pipe 217B is connected at the right side of the housing 201B. As describe above, the concentration of the BHP solution is decreased by the chemical reaction with the chlorine gas. Hence the BHP solution, whose concentration is decreased, is drained out through the drain pipes 217A and 217B as shown by arrows 218A and 218B.

A separation wall 211 is positioned above the rotating disc 204A and the rotating disc 204B. The separation wall 211 is a portion of the housing 201A. Even if the droplets are generated by flowing off the BHP solution adhered on the surface of the rotating disc 204A or the rotating disc 204B by the chlorine gas, the droplets cannot come directly into the laser cavity 202.

The separation wall 211 is positioned above the rotation axis 205A and the rotation axis 205B. For the rotating disc 204B which rotates clockwise, a path 221B is positioned on a right side of the separation wall 211. While for the rotating disc 204A which rotates counter-clockwise, a path 221A is positioned on the left side of the separation wall 211. Therefore, the separation wall 211 is positioned between the path 221A and the path 221B.

A block 222 is attached just above the rotating disc 204A and the rotating disc 204B to form a space into which the chlorine gas flows. The block 222 is located just below the separation wall 211. As a result of attaching the block 222 as mentioned above, the chlorine gas flows only near the surfaces of the rotating disc 204A and the rotating disc 204B. This prevents the chlorine gas from coming into the laser cavity 202 without contacting the BHP solution. Also the block 222 has a function to reduce a dead space. Therefore, the percentage of the volume of the laser cavity 202 out of the all the volume where $O_2(^1\Delta_g)$ can fill is as high as around 90%. The material of the block 222 is preferably a material having corrosion resistance and good machinability. Therefore, for example a fluorine-based resin, such as Teflon (registered trademark) or polypropylene, is desirable.

In the above mentioned embodiment, since the double-row rotating discs 204A and 204B are employed, the number of discs can be increased. Consequently, the surface area of the chemical reaction for the $O_2(^1\Delta_g)$ generation is increased. Therefore, the $O_2(^1\Delta_g)$ generation rate can be increased, which enables a high laser output energy to be obtained.

Third Embodiment

Figure 9:
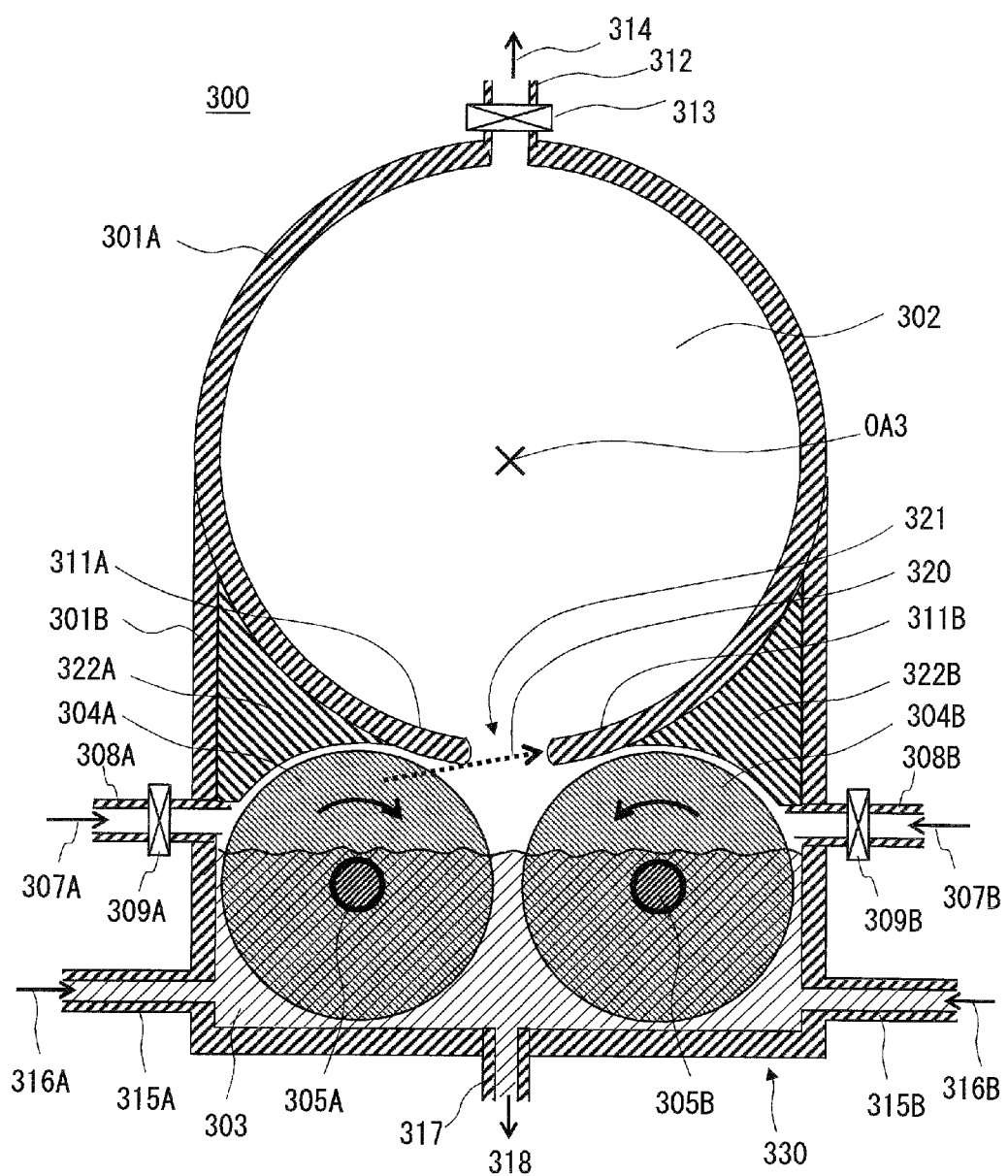
FIG. 9 is a cross sectional drawing of an oxygen laser oscillator 300 according to an embodiment of the invention.
Figure 10:
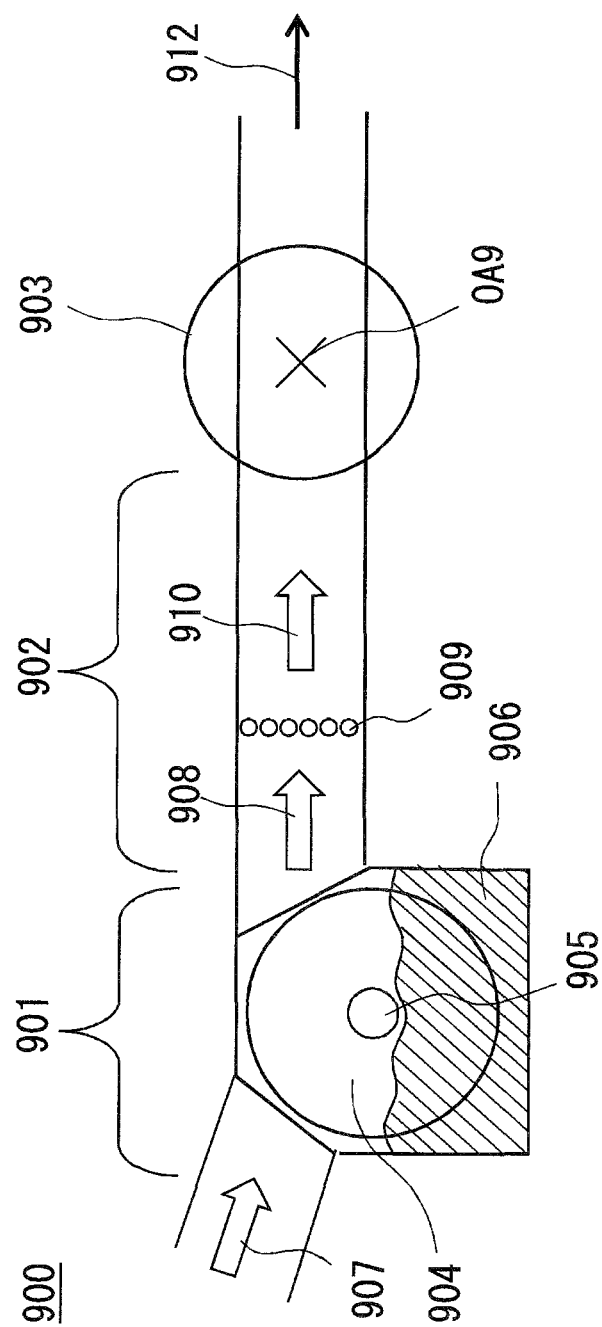
FIG. 10 is a cross sectional drawing of a COIL using a rotating disc generator.

Next, a third embodiment according to the present invention will be described with reference to FIG. 9. FIG. 9 is a cross sectional drawing of an oxygen laser oscillator 300. The oxygen laser oscillator 300 has a laser cavity 302 which is formed by a housing 301A made of a large-diameter thick-walled pipe to obtain a large mode volume. Therefore, double-row rotating discs 304A and 304B are employed to generate $O_2(^1\Delta_g)$.

The oxygen laser oscillator 300 has the double-row rotating discs 304A and 304B in order to produce high laser output energy. This configuration is different from that of the first embodiment. An explanation of contents similar to those of the first embodiment will be omitted. The rotation axis 305A and the rotation axis 305B are hollow in order to flow the coolant into the rotation axes 305A and 305B

Rotating directions of the rotating disc 304A and disc 305B are opposite to those of the rotating discs 204A and 204B shown in FIG. 8. For example, in a cross section perpendicular to the rotation axis 305A, the rotating disc 304B and the rotating disc 304A are aligned right to left. The rotating disc 304A place at a left side rotates clockwise and the rotating disc 304B placed at a right side rotates counter-clockwise.

Two injection pipes 308A and 308B are placed outside of the rotating disc 304A or the rotating disc 304B. For instance, the injection pipe 308A which supplies chlorine gas to the rotating disc 304A is connected at a left side surface of the housing 301B, while the injection pipe 308B which supplies chlorine gas to the rotating disc 304B is connected at a right side surface of the housing 301B. The Chlorine gas is supplied as shown by arrows 307A and 307B. When valves 309A and 309B are opened, the chlorine gas flows into the housing 301B, which starts the chemical reaction of the $O_2(^1\Delta_g)$ generation.

Two supply pipes 315A and 315B are connected at the outside of the rotating disc 304A and the rotating disc 304B respectively. The supply pipe 315A is connected at a lower part of the left side surface of the housing 301B, while supply pipe 315B is connected at a lower part of the right side surface of the housing 301B. The BHP solution is supplied to the housing 301B through the supply pipe 315A and the supply pipe 315B as shown by arrows 316A and 316B. A drain pipe 317 is connected at a bottom of the housing 301B. The drain pipe 317 is positioned between the rotating disc 304A and the rotating disc 304B in a horizontal direction. The BHP solution whose concentration is decreased by the chemical reaction is drained out through the drain pipe 317 as shown by an arrow 318.

In this embodiment, two blocks 322A and 322B are attached to the inside of the housing 301B to form a space into which the chlorine gas injected for the chemical reaction flows. The blocks 322A and 322B prevent the chlorine gas from directly coming into the laser cavity 302 without contacting the BHP solution. Just like the block 222, the material of the block 322A and the block 322B is desirably Teflon (a registered trademark), polypropylene or the like.

In this embodiment, $O_2(^1\Delta_g)$ generated at the double-row rotating discs 304A and 304B is supplied into the laser cavity 302 through the single path 321. The path 321 is positioned just below an optical axis OA3. For the rotating disc 304A which rotates clockwise, the path 321 is positioned at a right side of a separation wall 311A, while, in the rotating disc 304B which rotates counter-clockwise, the path 321 is positioned at a left side of a separation wall 311B.

This simplifies a manufacture of the housing 301A composed of the laser cavity 302. In other word, the path 321 can be formed by forming a wide slit on a pipe which is a material of the housing 301A.

If the Chlorine gas flows off the BHP solution adhered on the surface of the rotating disc 304A, the generated droplets 420 fly as shown by a dotted arrow and just hit an edge of the separation wall 311B. Therefore, the droplets 320 can hardly come into the laser cavity 302. Although the separation walls 311A and 311B are a part of the housing 301A, they are specially called "separation walls" since they are positioned just above the rotating discs 304A and 304B in order to block the droplets.

In the above mentioned embodiment, since the double-row rotating discs 304A and 304B are employed, the number of rotating discs can be increased. Consequently, the surface area of the chemical reaction for the $O_2(^1\Delta_g)$ generation is increased. Therefore, the $O_2(^1\Delta_g)$ generation rate can be increased, which enables a high laser output energy to be produced.

Although the rotating discs are rotated to generate $O_2(^1\Delta_g)$ in the first to third embodiments, instead other shaped plate can be rotated. A rotating plate with a shape other than a circular disc can be rotated. In other words, $O_2(^1\Delta_g)$ can be generated by supplying chlorine gas to the rotating plate immersed in the BHP solution.

While the invention has been particularly shown and described with reference to exemplary embodiments thereof, the invention includes various changes which do not negatively affect the purpose and benefits of the invention and is not limited to these exemplary embodiments.

INDUSTRIAL APPLICABILITY

According to the present invention, an oxygen laser oscillator can be realized and a pulsed laser can be produced. Especially, since scale up is easy, an extremely large energy pulsed laser can be produced by employing a large volume chamber which can store a high volume of single oxygen molecules. Therefore the present invention is suitable for a driver of inertial confinement fusion which needs an extremely large energy pulsed laser or a device for destroying a dangerous flying object.

REFERENCE SIGNS LIST

100 OXYGEN LASER OSCILATOR
101A, 101B HOUSINGS
102 LASER CAVITY
103 BHP SOLUTION
104 ROTATING DISC
105 ROTATION AXIS
106 ROTATING DIRECTION
107 CHLORINE GAS FLOW DIRECTION
108 INJECTION PIPE
109 VALVE
110 FLOW DIRECTION
111 SEPARATION WALL
112 EXHAUST PIPE
113 VALVE
114 EXHAUST DIRECTION
115 SUPPLY PIPE
116A, 116B BHP SOLUTION FLOW DIRECTIONS
117 DRAIN PIPE
118A, 118B BHP SOLUTION FLOW DIRECTIONS
119 DROPLET FLOW DIRECTION BY THE CONTACT OF CHLORINE GAS
120 DROPLET FLOW DIRECTION BY THE CENTRIFUGAL FOURCE
121 PATH
121C INSIDE WALL
123 MOTOR
124A, 124B FLOW ECONTROLLERS
125 TUBE
126A, 126B O RINGS
127 COOLING DEVICE
131 TOTAL REFLECTOR
132 OUTPUT MIRROR
200 OXYGEN LASER OSCILATOR
201A, 201B HOUSINGS
202 LASER CAVITY
203 BHP SOLUTION
204A, 204B ROTATING DISCS
205A, 205B ROTATION AXES
207 CHLORINE GAS FLOW DIRECTION
208 INJECTION PIPE
211 SEPARATION WALL
212 EXHAUST PIPE
213 VALVE
214 EXHAUST DIRECTION
215A, 215B SUPPLY PIPES
216A, 216B BHP SOLUTION FLOW DIRECTIONS
217A, 217B DRAIN PIPES
218A, 218B BHP SOLUTION FLOW DIRECTIONS
221A, 221B PATHS
222 BLOCK
300 OXYGEN LASER OSCILATOR
301A, 301B HOUSINGS
302 LASER CAVITY
303 BHP SOLUTION
304A, 304B ROTATING DISCS
305A, 305B ROTATION AXES
307A, 307B CHLORINE GAS FLOW DIRECTIONS
308A, 308B INJECTION PIPES
311A, 311B SEPARATION WALLS
312 EXHAUST PIPE
313 VALVE
314 PUMPED DIRECTION
315A, 315B SUPPLY PIPES
316A, 316B BHP SOLUTION FLOW DIRECTIONS
317 DRAIN PIPE

318 BHP SOLUTION FLOW DIRECTION
320 DROPLET FLOW DIRECTION
321 PATH
322A, 322B BLOCKS
900 COIL
901 SOG
902 REACTION PORTION BETWEEN SINGLET OXYGEN AND IODINE ATM
903 LASER CAVITY
904 ROTATING DISC
905 ROTATION AXIS
906 BHP SOLUTION
907 CHLORINE GAS
908 DIRECTION OF SINGLET OXYGEN
909 IODINE ATOM INJECTOR
910 DIRECTION OF FLOW OF SINGLET OXYGEN AND IODINE ATM
912 EXHAUST DIRECTION
LA1 LASER
OA1, OA2, OA3, OA9 OPTICAL AXES

The invention claimed is:

1. An oxygen laser oscillator comprising:
a singlet oxygen generator having a housing in which a BHP solution is stored and a rotating plate which rotates in the housing; and
an injection pipe supplying a chlorine gas reacting with the BHP solution on a surface of the rotating plate into an upper space in the housing to generate the singlet oxygen;
a laser cavity positioned immediately above the singlet oxygen generator and directly connected to the singlet oxygen generator by a path; and
a separation wall positioned between the singlet oxygen generator and the laser cavity and located directly above a rotation axis of the rotating plate with the separation wall spaced in a vertical direction from the rotation axis of the rotation plate so that the separation wall extends across a location directly vertically above the rotation axis;
wherein the path directly connecting the singlet oxygen generator and the laser cavity is positioned above the rotation axis and offset horizontally with respect to the rotation axis such that said path is not directly above the rotation axis.

2. The oxygen laser oscillator according to claim 1, wherein along the rotation axis of the rotating plate a hollow shaped portion is provided and a coolant flows through the hollow shaped portion along the rotation axis.

3. The oxygen laser oscillator according to claim 1, wherein, when viewing the singlet oxygen generator along the rotation axis so that the rotating plate rotates clockwise, the path through which the singlet oxygen flows between the singlet oxygen generator and the laser cavity is positioned at a right side of the separation wall.

4. The oxygen laser oscillator according to claim 1, wherein a housing of the singlet oxygen generator and a housing of the laser cavity are cylindrical.

5. The oxygen laser according to claim 1, wherein the separation wall is positioned such that a line extending from the rotation axis to an optical axis of the laser cavity passes through said separation wall.

* * * * *